United States Patent
Hao

(10) Patent No.: US 10,591,792 B2
(45) Date of Patent: Mar. 17, 2020

(54) LIQUID CRYSTAL DISPLAY PANEL AND DEVICE

(71) Applicant: SHENZHEN CHINA STAR OPTOELECTRONICS SEMICONDUCTOR DISPLAY TECHNOLOGY CO., LTD, Shenzhen, Guangdong (CN)

(72) Inventor: Sikun Hao, Guangdong (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 122 days.

(21) Appl. No.: 15/577,351

(22) PCT Filed: Oct. 18, 2017

(86) PCT No.: PCT/CN2017/106646
§ 371 (c)(1),
(2) Date: Nov. 28, 2017

(87) PCT Pub. No.: WO2019/033534
PCT Pub. Date: Feb. 21, 2019

(65) Prior Publication Data
US 2019/0219878 A1    Jul. 18, 2019

(30) Foreign Application Priority Data

Aug. 17, 2017    (CN) .......................... 2017 1 0705351

(51) Int. Cl.
*G02F 1/1362* (2006.01)
*G02F 1/1368* (2006.01)
*G09G 3/36* (2006.01)

(52) U.S. Cl.
CPC ...... *G02F 1/136286* (2013.01); *G02F 1/1368* (2013.01); *G09G 3/3614* (2013.01);
(Continued)

(58) Field of Classification Search
CPC ............. G02F 1/1368; G02F 1/136286; G02F 1/13624; G02F 2001/136245; G09G 3/3614; G09G 2300/0823; G09G 3/3611
See application file for complete search history.

(56) References Cited

U.S. PATENT DOCUMENTS

2009/0290081 A1* 11/2009 Cho .................. G02F 1/136286
349/42
2012/0154368 A1* 6/2012 Sakurai ............. G02F 1/134363
345/212

(Continued)

FOREIGN PATENT DOCUMENTS

CN      101587270 A    11/2009
CN      202003648 U    10/2011
(Continued)

*Primary Examiner* — Paisley L Wilson
*Assistant Examiner* — Mariam Qureshi
(74) *Attorney, Agent, or Firm* — Soroker Agmon Nordman

(57) ABSTRACT

A liquid crystal display panel and device is provided. In the panel, a gate electrode of a first thin-film transistor of a pixel at (n)th row and (2k+1)th column connects to a second scan line of pixels in (n−1)th row, a source electrode of the first thin-film transistor of the pixel at (n)th row and (2k+1)th column connects to a corresponding common line, and a drain electrode of the first thin-film transistor of the pixel at (n)th row and (2k+1)th column connects to a pixel at (n)th row and (2k+1)th column.

16 Claims, 5 Drawing Sheets

(52) U.S. Cl.
CPC ... *G09G 3/3648* (2013.01); *G09G 2300/0426* (2013.01); *G09G 2310/0205* (2013.01)

(56) References Cited

U.S. PATENT DOCUMENTS

| | | | |
|---|---|---|---|
| 2015/0029080 A1* | 1/2015 | Kwon | G09G 3/3648 345/90 |
| 2016/0231605 A1 | 8/2016 | Yu et al. | |
| 2019/0051667 A1 | 2/2019 | Cai et al. | |

FOREIGN PATENT DOCUMENTS

| | | |
|---|---|---|
| CN | 104678668 A | 6/2015 |
| CN | 104914640 A | 9/2015 |
| CN | 106959563 A | 7/2017 |
| KR | 20130067923 A | 6/2013 |

* cited by examiner

LIQUID CRYSTAL DISPLAY PANEL AND DEVICE

CROSS REFERENCE TO RELATED APPLICATION

This application claims the priority of International Application No. PCT/CN2017/106646, filed Oct. 18, 2017, titled "LIQUID CRYSTAL DISPLAY PANEL AND DEVICE", which claims priority to Chinese Application filed on Aug. 17, 2017. The entire disclosures of each of the applications are incorporated herein by reference.

BACKGROUND

1. Field of the Disclosure

The present disclosure relates to display technologies, and more particularly to a liquid crystal display panel and device.

2. Description of the Related Art

Liquid crystal displays are now the most widely used flat displays and are used in various electronic devices such as mobile phones, personal digital assistants (PDAs), computer screens, and notebook screens.

The widely used liquid crystal displays usually consist of a top substrate, a bottom substrate, and a liquid crystal layer. The substrates are made using glass and electrodes. A display in a vertical electric field mode, such as a twist nematic (TN) mode, a vertical alignment (VA) mode, and a multi-domain vertical alignment (MVA) mode solves the issue of narrow view angles when electrodes are disposed both on the top substrate and the bottom substrate. A display in a horizontal electric filed mode, such as in-plane switching (IPS) mode and fringe field switching (FFS) mode, is formed when electrodes are disposed only on one of the substrates.

As shown in FIG. 1, an existing liquid crystal display panel includes a plurality of scan lines G0-G7, a plurality of data lines D1-D3, and a plurality of pixels. Each row of pixels corresponds to two scan lines. That is, the number of scan lines is twice the horizontal resolution. Each data line drives two columns of pixels at a right side and a left side, that is, the vertical horizontal is twice the number of data lines. As shown in FIG. 2, Data1 represents a data signal input to a data line D1; Data2 represents a data signal input to a data line D2; Gate1 represents a scan signal input to a first scan line G1; Gate2 represents a scan signal input to a second scan line G2; Pixel11 represents an actual voltage waveform of a pixel 101 in FIG. 1; Pixel12 represents an actual voltage waveform of a pixel 102 in FIG. 1; Pixel21 represents an actual voltage waveform of a pixel 103 in FIG. 1; Pixel22 represents an actual voltage waveform of a pixel 104 in FIG. 1.

The pixel 101 comes after polarity inversion of the data signal, and thus has a low charge rate. The pixel 102 comes before polarity inversion of the data signal, and thus has a high charge rate. As can be known, the difference of charge rates of two adjacent pixels is large. Accordingly, it is easy to cause image blinking and sticking.

Therefore, it is necessary to provide a liquid crystal display panel and device for solving the problems of existing methods.

SUMMARY

The objective of the present disclosure is to provide a liquid crystal display panel and device for improving display quality.

To solve above problems, the present disclosure provides a liquid crystal display panel, comprising a plurality of data lines, a plurality of scan lines, m common lines, and a plurality of pixels, the plural pixels forming N rows of pixels and M columns of pixels, each row of pixels corresponding to two scan lines, every two columns of pixels corresponding to one data line, each common line corresponding to at least one column of pixels, the common line configured to input a common voltage;

each pixel comprises a first thin-film transistor, a gate electrode of the first thin-film transistor of a pixel at (n)th row and (2k+1)th column connects to a second scan line of pixels in (n−1)th row, a source electrode of the first thin-film transistor of the pixel at (n)th row and (2k+1)th column connects to a corresponding common line, a drain electrode of the first thin-film transistor of the pixel at (n)th row and (2k+1)th column connects to the pixel at (n)th row and (2k+1)th column;

a gate electrode of the first thin-film transistor of a pixel at (n)th row and (2k)th column connects to a first scan line of pixels in (n)th row, a source electrode of the first thin-film transistor of the pixel at (n)th row and (2k)th column connects to a corresponding common line, a drain electrode of the first thin-film transistor of the pixel at (n)th row and (2k)th column connects to the pixel at (n)th row and (2k)th column, where $0<n \leq N$, $N \geq 2$, $0 \leq k \leq (M-1)/2$, $M \geq m \geq 2$;

each pixel comprises a second thin-film transistor, a gate electrode of the second thin-film transistor of the pixel at (n)th row and (2k+1)th column connects to a first scan line of the pixels in (n)th row, a source electrode of the second thin-film transistor of the pixel at (n)th row and (2k+1)th column connects to a corresponding data line, a drain electrode of the second thin-film transistor of the pixel at (n)th row and (2k+1)th column connects to the pixel at (n)th row and (2k+1)th column;

a gate electrode of the second thin-film transistor of the pixel at (n)th row and (2k)th column connects to a second scan line of the pixels in (n)th row, a source electrode of the second thin-film transistor of the pixel at (n)th row and (2k)th column connects to a corresponding data line, a drain electrode of the second thin-film transistor of the pixel at (n)th row and (2k)th column connects to the pixel at (n)th row and (2k)th column;

pixels in a first column correspond to a first common line and pixels in an (M)th column correspond to an (m)th common line; for pixels in a second column to an (M−1)th column, every two columns of pixels correspond to one common line.

In the liquid crystal display panel, voltage polarity is inverted for two pixels on a same side of two adjacent data lines in a same row.

In the liquid crystal display panel, the first thin-film transistor is configured to input the common voltage to the pixel before a data signal is input to the pixel.

In the liquid crystal display panel, two adjacent common lines are located at two sides of two adjacent columns of pixels, respectively.

In the liquid crystal display panel, a voltage of the pixel is equal to the common voltage before a data voltage is input to the pixel.

The present disclosure provides a liquid crystal display panel comprising a plurality of data lines, a plurality of scan lines, m common lines, and a plurality of pixels, the plural pixels forming N rows of pixels and M columns of pixels, each row of pixels corresponding to two scan lines, every two columns of pixels corresponding to one data line, each common line corresponding to at least one column of pixels, the common line configured to input a common voltage;

each pixel comprises a first thin-film transistor, a gate electrode of the first thin-film transistor of a pixel at (n)th row and (2k+1)th column connects to a second scan line of pixels in (n−1)th row, a source electrode of the first thin-film transistor of the pixel at (n)th row and (2k+1)th column connects to a corresponding common line, a drain electrode of the first thin-film transistor of the pixel at (n)th row and (2k+1)th column connects to the pixel at (n)th row and (2k+1)th column;

a gate electrode of the first thin-film transistor of a pixel at (n)th row and (2k)th column connects to a first scan line of pixels in (n)th row, a source electrode of the first thin-film transistor of the pixel at (n)th row and (2k)th column connects to a corresponding common line, a drain electrode of the first thin-film transistor of the pixel at (n)th row and (2k)th column connects to the pixel at (n)th row and (2k)th column, where 0<n<N, N≥2, 0≤k≤(M−1)/2, M≥m≥2.

In the liquid crystal display panel, pixels in a first column correspond to a first common line and pixels in an (M)th column correspond to an (m)th common line; for pixels in a second column to an (M−1)th column, every two columns of pixels correspond to one common line.

In the liquid crystal display panel, each pixel comprises a second thin-film transistor, a gate electrode of the second thin-film transistor of the pixel at (n)th row and (2k+1)th column connects to a first scan line of the pixels in (n)th row, a source electrode of the second thin-film transistor of the pixel at (n)th row and (2k+1)th column connects to a corresponding data line, a drain electrode of the second thin-film transistor of the pixel at (n)th row and (2k+1)th column connects to the pixel at (n)th row and (2k+1)th column;

a gate electrode of the second thin-film transistor of the pixel at (n)th row and (2k)th column connects to a second scan line of the pixels in (n)th row, a source electrode of the second thin-film transistor of the pixel at (n)th row and (2k)th column connects to a corresponding data line, a drain electrode of the second thin-film transistor of the pixel at (n)th row and (2k)th column connects to the pixel at (n)th row and (2k)th column.

In the liquid crystal display panel, voltage polarity is inverted for two pixels on a same side of two adjacent data lines in a same row.

In the liquid crystal display panel, the first thin-film transistor is configured to input the common voltage to the pixel before a data signal is input to the pixel.

In the liquid crystal display panel, two adjacent common lines are located at two sides of two adjacent columns of pixels, respectively.

In the liquid crystal display panel, a voltage of the pixel is equal to the common voltage before a data voltage is input to the pixel.

The present disclosure further provides a liquid crystal display device, comprising:
a backlight module; and
a liquid crystal display panel, comprising:
a plurality of data lines, a plurality of scan lines, m common lines, and a plurality of pixels, the plural pixels forming N rows of pixels and M columns of pixels, each row of pixels corresponding to two scan lines, every two columns of pixels corresponding to one data line, each common line corresponding to at least one column of pixels, the common line configured to input a common voltage:

each pixel comprises a first thin-film transistor, a gate electrode of the first thin-film transistor of a pixel at (n)th row and (2k+1)th column connects to a second scan line of pixels in (n−1)th row, a source electrode of the first thin-film transistor of the pixel at (n)th row and (2k+1)th column connects to a corresponding common line, a drain electrode of the first thin-film transistor of the pixel at (n)th row and (2k+1)th column connects to the pixel at (n)th row and (2k+1)th column;

a gate electrode of the first thin-film transistor of a pixel at (n)th row and (2k)th column connects to a first scan line of pixels in (n)th row, a source electrode of the first thin-film transistor of the pixel at (n)th row and (2k)th column connects to a corresponding common line, a drain electrode of the first thin-film transistor of the pixel at (n)th row and (2k)th column connects to the pixel at (n)th row and (2k)th column, where 0<n<N, N≥2, 0≤k≤(M−1)/2, M≥m≥2.

In the liquid crystal display device, pixels in a first column correspond to a first common line and pixels in an (M)th column correspond to an (m)th common line; for pixels in a second column to an (M−1)th column, every two columns of pixels correspond to one common line.

In the liquid crystal display device, each pixel comprises a second thin-film transistor, a gate electrode of the second thin-film transistor of the pixel at (n)th row and (2k+1)th column connects to a first scan line of the pixels in (n)th row, a source electrode of the second thin-film transistor of the pixel at (n)th row and (2k+1)th column connects to a corresponding data line, a drain electrode of the second thin-film transistor of the pixel at (n)th row and (2k+1)th column connects to the pixel at (n)th row and (2k+1)th column;

a gate electrode of the second thin-film transistor of the pixel at (n)th row and (2k)th column connects to a second scan line of the pixels in (n)th row, a source electrode of the second thin-film transistor of the pixel at (n)th row and (2k)th column connects to a corresponding data line, a drain electrode of the second thin-film transistor of the pixel at (n)th row and (2k)th column connects to the pixel at (n)th row and (2k)th column.

In the liquid crystal display device, voltage polarity is inverted for two pixels on a same side of two adjacent data lines in a same row.

In the liquid crystal display device, the first thin-film transistor is configured to input the common voltage to the pixel before a data signal is input to the pixel.

In the liquid crystal display device, two adjacent common lines are located at two sides of two adjacent columns of pixels, respectively.

In the liquid crystal display device, a voltage of the pixel is equal to the common voltage before a data voltage is input to the pixel.

In the liquid crystal display panel and device of the present disclosure, two adjacent pixels before and after polarity inversion are precharged to the voltage of the common electrode, and therefore the difference of charge rates of the two adjacent pixels is reduced, thereby avoiding image blinking and sticking, and improving the quality of the liquid crystal display panel.

DETAILED DESCRIPTION OF THE PREFERRED EMBODIMENTS

The following descriptions for the embodiments are specific embodiments capable of being implemented for illustrating the present disclosure with referring to the appending figures. In describing the present disclosure, spatially relative terms such as "upper", "lower", "front", "back", "left", "right", "inner", "outer", "lateral", and the like, may be used herein for ease of description as illustrated in the figures. Therefore, the spatially relative terms used herein are intended to illustrate the present disclosure for ease of understanding, but are not intended to limit the present disclosure. In the appending drawings, units with similar structures are indicated by the same reference numbers.

Figure 1:
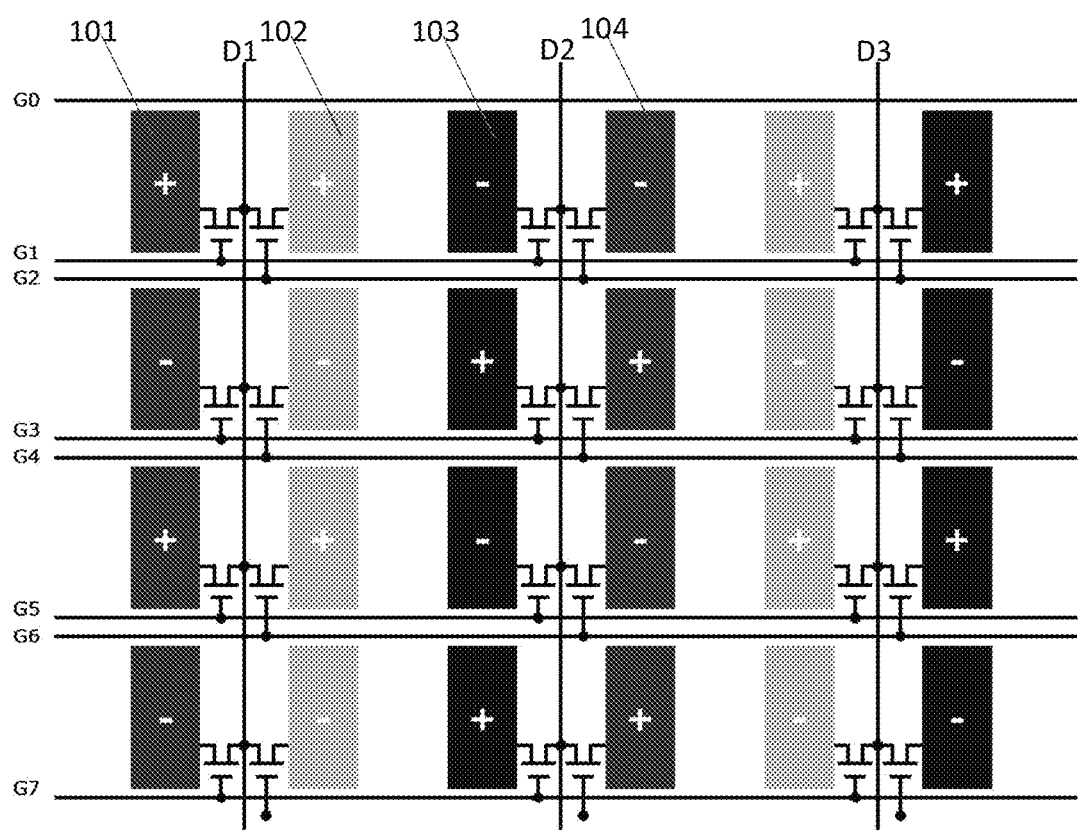
FIG. 1 is a schematic structural diagram showing an existing liquid crystal display panel.
Figure 2:
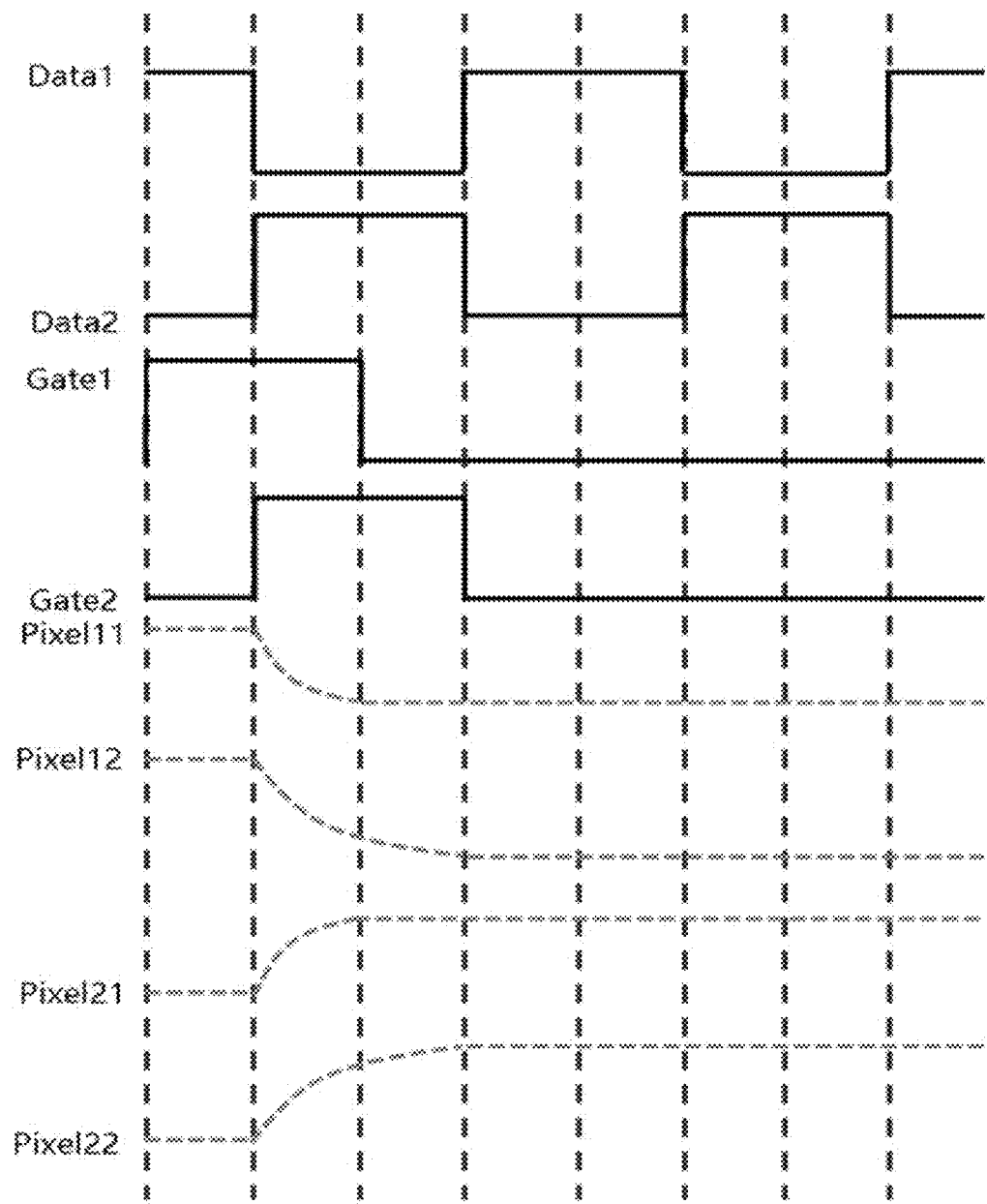
FIG. 2 is a diagram showing a waveform of a driving signal corresponding to FIG. 1.
Figure 3:
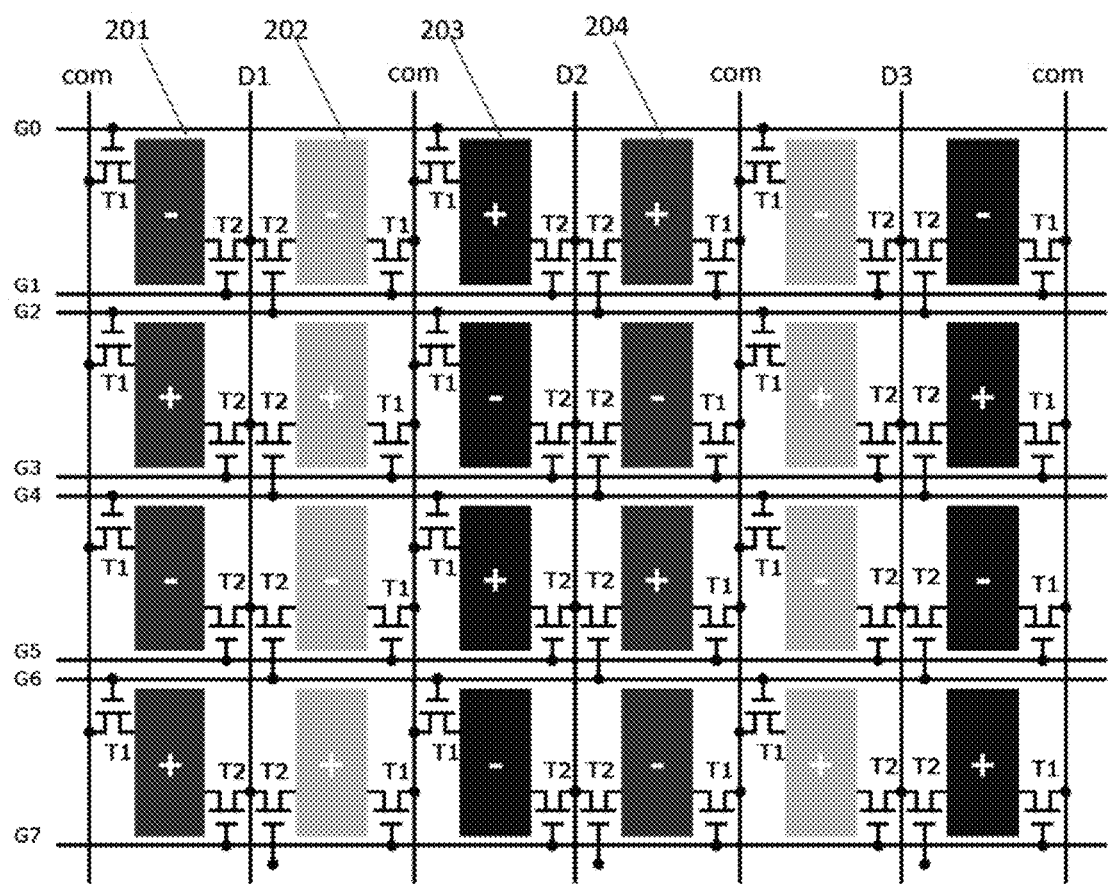
FIG. 3 is a schematic structural diagram showing a liquid crystal display panel in accordance with the present disclosure.
Figure 4:
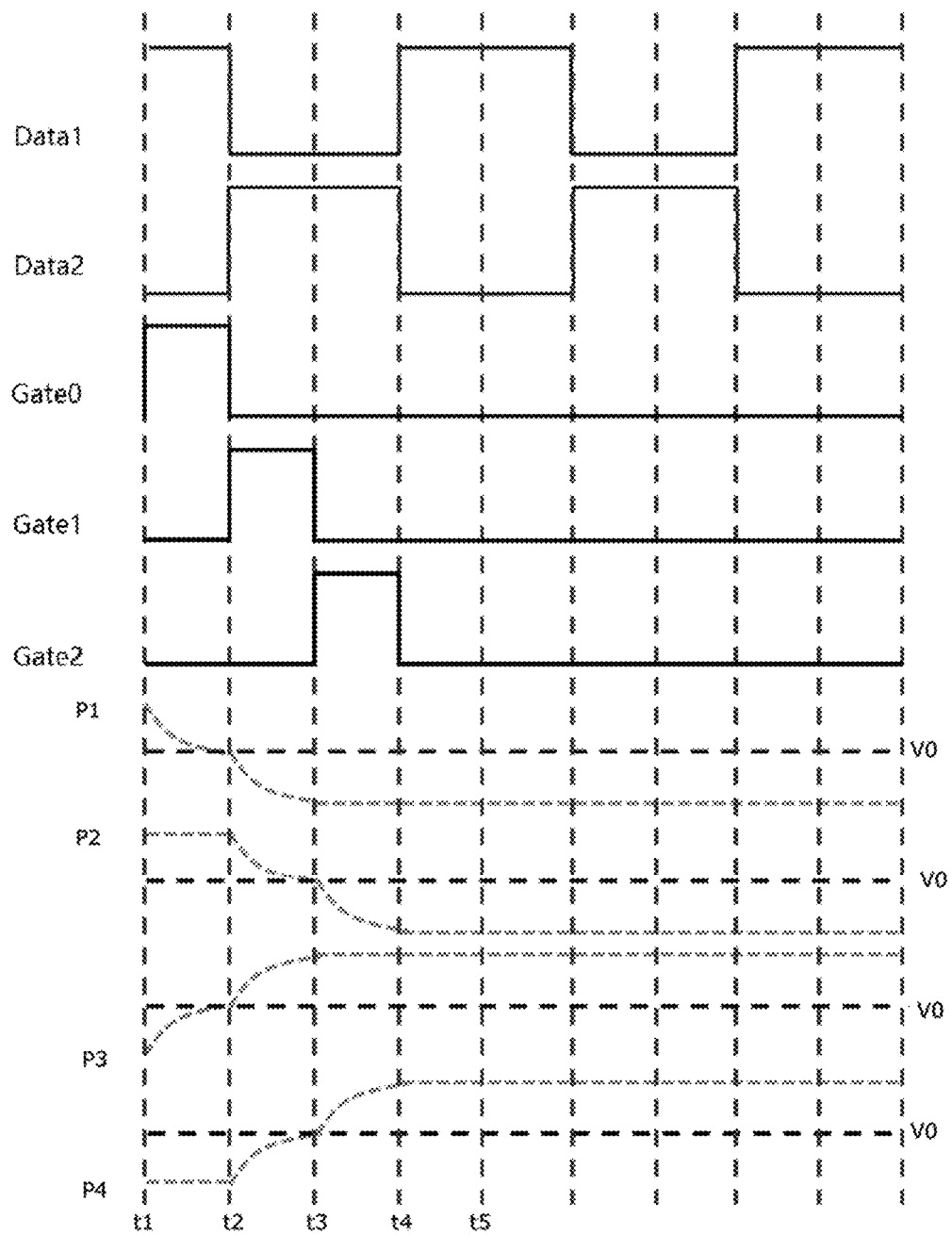
FIG. 4 is a diagram showing a waveform of a driving signal corresponding to FIG. 3.
Figure 5:
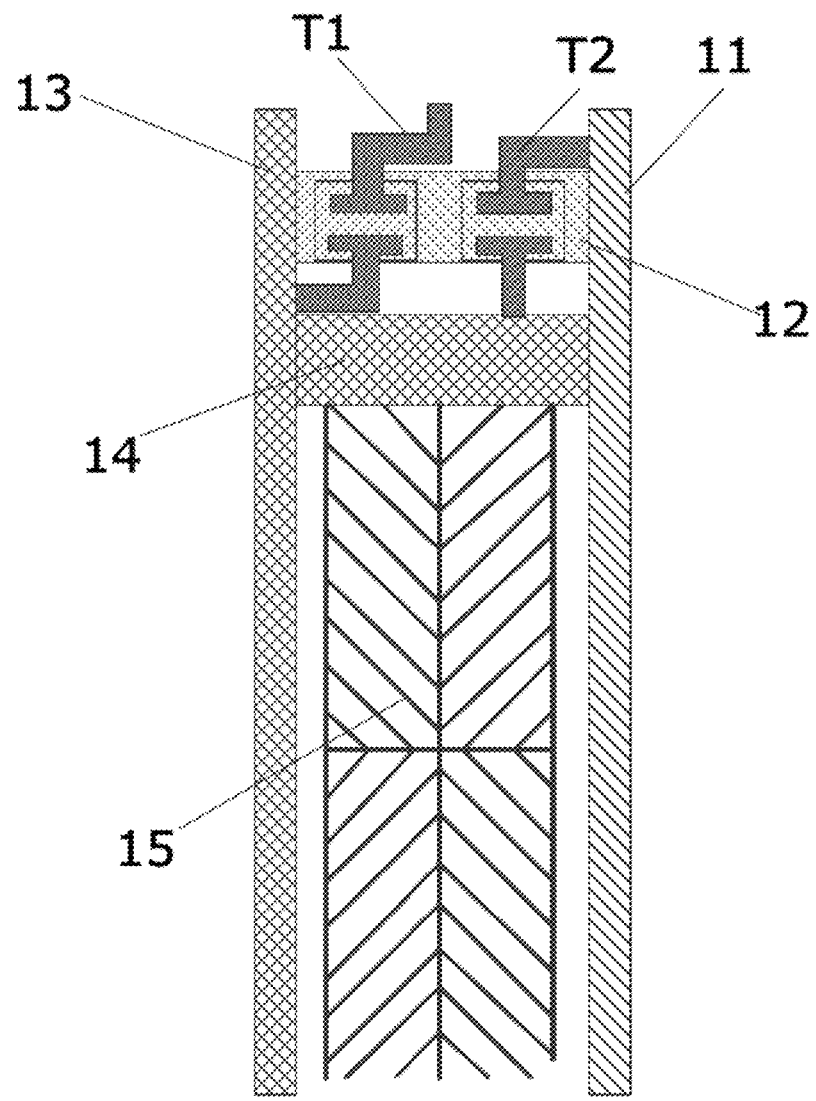
FIG. 5 is a schematic structural diagram showing a single pixel of FIG. 3.

Please refer to FIGS. 3-5. FIG. 3 is a schematic structural diagram showing a liquid crystal display panel in accordance with the present disclosure.

As shown in FIG. 3, the liquid crystal display panel of the present embodiment includes a plurality of scan lines G0-G7, a plurality of data lines D1-D3, m common lines com, and a plurality of pixels. The plural pixels forms N rows of pixels and M columns of pixels. The pixels include red pixels 201, green pixels, and blue pixels 203. Two adjacent columns of pixels have different colors. That is, pixels in a same column have a same color and two adjacent pixels in a same row have different colors. For example, pixels in a first column are red pixels R, pixels in a second column are green pixels G, and pixels in a third column are blue pixels B.

Each row of pixels corresponds to two scan lines. For example, pixels in a first row correspond to two scan lines G1 and G2. Every two columns of pixels correspond to one data line. Pixels in a first column correspond to a first common line. Pixels in an (M)th column correspond to an (m)th common line, that is, pixels in the last column correspond to the last common line. For pixels in a second column to an (M−1)th column, every two columns of pixels correspond to one common line. For instance, pixels in a first column connect to a first common line, pixels in a second column and a third column connect to a second common line, pixels in a fourth column and a fifth column connect to a third common line, and pixels in a sixth column connect to a fourth common line. Two adjacent common lines are located at two sides of two adjacent columns of pixels, respectively. For example, the first common line and the second common line are located at a left side and a right side of the pixels in the first column and the second column, respectively. Each common line is configured to input a voltage of a common electrode, that is, a common voltage.

Each pixel comprises a first thin-film transistor T1 and a second thin-film transistor T2. A gate electrode of the first thin-film transistor T1 of a pixel at (n)th row and (2k+1)th column (i.e., an odd column) connects to a second scan line of pixels in (n−1)th row, a source electrode of the first thin-film transistor of the pixel at (n)th row and (2k+1)th column connects to a corresponding common line, and a drain electrode of the first thin-film transistor T1 of the pixel at (n)th row and (2k+1)th column connects to the pixel at (n)th row and (2k+1)th column. For example, a gate electrode of the first thin-film transistor T1 of a pixel in a first row and a first column connects to a scan line G0, a source electrode of the first thin-film transistor T1 connects to a first common line, and its drain electrode connects to the pixel at the first row and the first column.

A gate electrode of the first thin-film transistor T1 of a pixel at (n)th row and (2k)th column (i.e., an even columns) connects to a first scan line of pixels in (n)th row, a source electrode of the first thin-film transistor T1 of the pixel at (n)th row and (2k)th column connects to a corresponding common line, and a drain electrode of the first thin-film transistor T1 of the pixel at (n)th row and (2k)th column connects to the pixel at (n)th row and (2k)th column. For example, a gate electrode of the first thin-film transistor T1 of a pixel in a first row and a second column connects to a scan line G1, a source electrode of the first thin-film transistor T1 connects to a second common line, and its drain electrode connects to the pixel at the first row and the second column, where $0<n<N$, $N≥2$, $0≤k≤(M−1)/2$, $M≥m≥2$.

A gate electrode of the second thin-film transistor T2 of the pixel at (n)th row and (2k+1)th column connects to a first scan line of the pixels in (n)th row, a source electrode of the second thin-film transistor T2 of the pixel at (n)th row and (2k+1)th column connects to a corresponding data line, and a drain electrode of the second thin-film transistor T2 of the pixel at (n)th row and (2k+1)th column connects to the pixel at (n)th row and (2k+1)th column. For example, a gate electrode of the second thin-film transistor T2 of a pixel in a first row and a first column connects to a scan line G1, a source electrode of the second thin-film transistor T2 connects to a data line D1, and its drain electrode connects to the pixel at the first row and the first column.

A gate electrode of the second thin-film transistor T2 of the pixel at (n)th row and (2k)th column connects to a second scan line of the pixels in (n)th row, a source electrode of the second thin-film transistor T2 of the pixel at (n)th row and (2k)th column connects to a corresponding data line, and a drain electrode of the second thin-film transistor T2 of the pixel at (n)th row and (2k)th column connects to the pixel at (n)th row and (2k)th column. For example, a gate electrode of the second thin-film transistor T2 of a pixel in a first row and a second column connects to a scan line G2, a source electrode of the second thin-film transistor T2 connects to a data line D1, and its drain electrode connects to the pixel at the first row and the second column.

The first thin-film transistor T1 is configured to input the common voltage to the pixel so as to precharge the pixel before a data signal is input to the pixel. The common line is configured to input a common voltage, that is, a voltage of a common electrode.

Preferably, voltage polarity is inverted for two pixels on a same side of two adjacent data lines in a same row. For example, voltage polarity is inverted for a pixel 201 at a left side of a data line D1 and a pixel 203 at a left side of a data line D2. For example, voltage polarity is inverted for a pixel 202 at a right side of a data line D1 and a pixel 204 at a right side of a data line D2, as shown in FIG. 4.

Preferably, two pixels at two different sides of a data line in a same row have a same voltage polarity. For example, in a first row, both of a pixel 201 at a left side of a data line D1 and a pixel 202 at a right side of the data line D1 have negative voltages.

Preferably, a voltage of each pixel is equal to the common voltage before a data voltage is input to the pixel, as shown in FIG. 4.

As shown in FIG. 4, Data1 represents a data signal input to a data line D1; Data2 represents a data signal input to a data line D2; Gate0 represents a scan signal input to a scan line G0; Gate1 represents a scan signal input to a scan line G1; Gate2 represents a scan signal input to a scan line G2; P1 represents an actual voltage waveform of a pixel 201 in FIG. 3; P2 represents an actual voltage waveform of a pixel 202 in FIG. 3; P3 represents an actual voltage waveform of a pixel 203 in FIG. 3; P4 represents an actual voltage waveform of a pixel 204 in FIG. 3; V0 represents a voltage of a common electrode, that is, a voltage of the common electrode on an array substrate.

At t1-t2 interval, the voltage of a scan signal of a scan line G1 is at a low level, and the voltage of a scan signal of a scan line G0 is at a high level. Meanwhile, the first thin-film transistor T1 of a pixel 201 is turned on and the pixel 201 is input with a voltage V0 of the common electrode, that is, the pixel 201 is precharged. At t2-t3 interval, the voltage of the scan signal of the scan line G1 is at a high level. Meanwhile, the second thin-film transistor T2 of the pixel 201 is turned on and the pixel 201 is input with a data voltage of a data line D1. The voltage of the data signal Data1 is low voltage level, and the voltage of P1 is changed to the voltage of Data1, that is, the voltage decreases. After that, the voltage of P1 is maintained.

At t1-t2 interval, the voltage of a scan signal of a scan line G1 is at a low level, and the voltage of a scan signal of a scan line G2 is at a low level. Meanwhile, both of the first thin-film transistor T1 and the second thin-film transistor T2 of a pixel 202 are turned off, and the voltage of P2 is an initial voltage level. At t2-t3 interval, the voltage of the scan signal of the scan line G1 is at a high level. Meanwhile, the first thin-film transistor T1 of the pixel 202 is turned on and the pixel 202 is input with a voltage V0 of the common electrode. The voltage of P2 is changed toward V0. At t3-t4 interval, the voltage of the scan signal of the scan line G1 is at a low level and the first thin-film transistor T1 of the pixel 202 is turned off. Also, the voltage of a scan signal of a scan line G2 is at a high level and the second thin-film transistor T2 of the pixel 202 is turned on. Meanwhile, the pixel 202 is input with a data voltage of a data line D1. The data voltage input to the data line D1 is low voltage level, and the voltage of P2 is the voltage of Data1, that is, the voltage decreases again. After that, the voltage of P2 is maintained.

At t1-t2 interval, the voltage of a scan signal of a scan line G1 is at a low level, and the voltage of a scan signal of a scan line G0 is at a high level. Meanwhile, the first thin-film transistor T1 of a pixel 203 is turned on and the pixel 203 is input with a voltage V0 of the common electrode, that is, the pixel 203 is precharged. At t2-t3 interval, the voltage of the scan signal of the scan line G1 is at a high level. Meanwhile, the second thin-film transistor T2 of the pixel 203 is turned on and the pixel 203 is input with a data voltage of a data line D2. The voltage of the data signal Data2 is high voltage level, and the voltage of P3 is changed to the voltage of Data2, that is, the voltage is changed to a high voltage level. After that, the voltage of P3 is maintained.

At t1-t2 interval, the voltage of a scan signal of a scan line G1 is at a low level, and the voltage of a scan signal of a scan line G2 is at a low level. Meanwhile, both of the first thin-film transistor T1 and the second thin-film transistor T2 of a pixel 204 are turned off, and the voltage of P4 is an initial voltage level.

At t2-t3 interval, the voltage of the scan signal of the scan line G1 is at a high level. Meanwhile, the first thin-film transistor T1 of the pixel 204 is turned on and the pixel 204 is input with a voltage V0 of the common electrode, that is, the voltage of P4 is changed toward the voltage V0 of the common electrode. At t3-t4 interval, the voltage of the scan signal of the scan line G1 is at a low level and the first thin-film transistor T1 of the pixel 204 is turned off. Also, the voltage of the scan signal of the scan line G2 is at a high level and the second thin-film transistor T2 of the pixel 204 is turned on. Meanwhile, the pixel 204 is input with a data voltage of a data line D2. The data voltage input to the data line D2 is high voltage level, and the voltage of P4 is changed toward the voltage of Data2, that is, the voltage increases again. After that, the voltage of P4 is maintained.

As can be seen, the pixel in a first row and a first column comes after polarity inversion and the pixel in a first row and a second column comes before polarity inversion. However, the two pixels are precharged to the voltage of the common electrode. Accordingly, the difference of charge rates of the two pixels is reduced, thereby avoiding image blinking and sticking occurred in the liquid crystal display panel.

FIG. 5 is a structural diagram showing a single pixel in the liquid crystal display of the present disclosure. As shown in FIG. 5, each pixel has a data line 11 arranged along vertical direction, a scan line 12 arranged along horizontal direction, and a common line 13 arranged along vertical direction or a common line 14 arranged along horizontal direction. Each pixel has two thin-film transistors T1 and T2. T1 is configured to precharge a first pixel of two adjacent pixels before charging the first pixel, and to precharge a second pixel of the two adjacent pixels when charging the first pixel such that each pixel is precharged to the voltage of the common electrode. T2 is configured to charge each pixel, that is, inputting a data voltage to a pixel electrode 15 of each pixel such that a gray value is shown on an actual screen.

As an embodiment, the present disclosure further provides a liquid crystal display device including a backlight module and the afore-described liquid crystal display panel.

In the liquid crystal display panel and device of the present disclosure, two adjacent pixels before and after polarity inversion are precharged to the voltage of the common electrode, and therefore the difference of charge rates of the two adjacent pixels is reduced, thereby avoiding image blinking and sticking, and improving the quality of the liquid crystal display panel.

Above all, while the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

What is claimed is:

1. A liquid crystal display panel, comprising:
a plurality of data lines;
a plurality of scan lines;
m common lines; and
a plurality of pixels forming N rows of pixels and M columns of pixels, each pixel comprising a first thin-film transistor and a second thin-film transistor, each row of pixels corresponding to two scan lines including a first scan line and a second scan line, every two columns of pixels corresponding to one data line, each common line corresponding to at least one column of pixels, the common line configured to input a common voltage;

wherein a gate electrode of the first thin-film transistor of a pixel at (n)th row and (2k+1)th column connects to the second scan line of pixels in (n−1)th row, a source electrode of the first thin-film transistor of the pixel at (n)th row and (2k+1)th column connects to a corresponding common line, a drain electrode of the first thin-film transistor of the pixel at (n)th row and (2k+1)th column connects to the pixel at (n)th row and (2k+1)th column;

wherein a gate electrode of the first thin-film transistor of a pixel at (n)th row and (2k)th column connects to the first scan line of pixels in (n)th row, a source electrode of the first thin-film transistor of the pixel at (n)th row and (2k)th column connects to a corresponding common line, a drain electrode of the first thin-film transistor of the pixel at (n)th row and (2k)th column connects to the pixel at (n)th row and (2k)th column, where $0<n<N$, $N\geq 2$, $0\leq k\leq (M-1)/2$, $M\geq m\geq 2$;

wherein a gate electrode of the second thin-film transistor of the pixel at (n)th row and (2k+1)th column connects to the first scan line of the pixels in (n)th row, a source electrode of the second thin-film transistor of the pixel at (n)th row and (2k+1)th column connects to a corresponding data line, a drain electrode of the second thin-film transistor of the pixel at (n)th row and (2k+1)th column connects to the pixel at (n)th row and (2k+1)th column;

wherein a gate electrode of the second thin-film transistor of the pixel at (n)th row and (2k)th column connects to the second scan line of the pixels in (n)th row, a source electrode of the second thin-film transistor of the pixel at (n)th row and (2k)th column connects to a corresponding data line, a drain electrode of the second thin-film transistor of the pixel at (n)th row and (2k)th column connects to the pixel at (n)th row and (2k)th column; and wherein pixels in a first column correspond to a first common line and pixels in an (M)th column correspond to an (m)th common line; for pixels in a second column to an (M−1)th column, every two columns of pixels correspond to one common line.

2. The liquid crystal display panel according to claim 1, wherein voltage polarity is inverted for two pixels on a same side of two adjacent data lines in a same row.

3. The liquid crystal display panel according to claim 1, wherein the first thin-film transistor is configured to input the common voltage to the pixel before a data signal is input to the pixel.

4. The liquid crystal display panel according to claim 1, wherein two adjacent common lines are located at two sides of two adjacent columns of pixels, respectively.

5. The liquid crystal display panel according to claim 1, wherein a voltage of the pixel is equal to the common voltage before a data voltage is input to the pixel.

6. A liquid crystal display panel, comprising:
a plurality of data lines;
a plurality of scan lines;
m common lines; and
a plurality of pixels forming N rows of pixels and M columns of pixels, each pixel comprising a first thin-film transistor and a second thin-film transistor, each row of pixels corresponding to two scan lines including a first scan line and a second scan line, every two columns of pixels corresponding to one data line, each common line corresponding to at least one column of pixels, the common line configured to input a common voltage;

wherein a gate electrode of the first thin-film transistor of a pixel at (n)th row and (2k+1)th column connects to the second scan line of pixels in (n−1)th row, a source electrode of the first thin-film transistor of the pixel at (n)th row and (2k+1)th column connects to a corresponding common line, a drain electrode of the first thin-film transistor of the pixel at (n)th row and (2k+1)th column connects to the pixel at (n)th row and (2k+1)th column; and wherein a gate electrode of the first thin-film transistor of a pixel at (n)th row and (2k)th column connects to the first scan line of pixels in (n)th row, a source electrode of the first thin-film transistor of the pixel at (n)th row and (2k)th column connects to a corresponding common line, a drain electrode of the first thin-film transistor of the pixel at (n)th row and (2k)th column connects to the pixel at (n)th row and (2k)th column, where $0<n<N$, $N\geq 2$, $0\leq k\leq (M-1)/2$, $M\geq m\geq 2$, wherein a gate electrode of the second thin-film transistor of the pixel at (n)th row and (2k+1)th column connects to the first scan line of the pixels in (n)th row, a source electrode of the second thin-film transistor of the pixel at (n)th row and (2k+1)th column connects to a corresponding data line, a drain electrode of the second thin-film transistor of the pixel at (n)th row and (2k+1)th column connects to the pixel at (n)th row and (2k+1)th column; and a gate electrode of the second thin-film transistor of the pixel at (n)th row and (2k)th column connects to the second scan line of the pixels in (n)th row, a source electrode of the second thin-film transistor of the pixel at (n)th row and (2k)th column connects to a corresponding data line, a drain electrode of the second thin-film transistor of the pixel at (n)th row and (2k)th column connects to the pixel at (n)th row and (2k)th column.

7. The liquid crystal display panel according to claim 6, wherein voltage polarity is inverted for two pixels on a same side of two adjacent data lines in a same row.

8. The liquid crystal display panel according to claim 6, wherein the first thin-film transistor is configured to input the common voltage to the pixel before a data signal is input to the pixel.

9. The liquid crystal display panel according to claim 6, wherein two adjacent common lines are located at two sides of two adjacent columns of pixels, respectively.

10. The liquid crystal display panel according to claim 6, wherein a voltage of the pixel is equal to the common voltage before a data voltage is input to the pixel.

11. A liquid crystal display device, comprising:
a backlight module; and
a liquid crystal display panel, comprising:
a plurality of data lines;
a plurality of scan lines;
m common lines; and
a plurality of pixels forming N rows of pixels and M columns of pixels, each pixel comprising a first thin-film transistor and a second thin-film transistor, each row of pixels corresponding to two scan lines including a first scan line and a second scan line, every two columns of pixels corresponding to one data line, each common line corresponding to at least one column of pixels, the common line configured to input a common voltage;

wherein a gate electrode of the first thin-film transistor of a pixel at (n)th row and (2k+1)th column connects to the second scan line of pixels in (n−1)th row, a source electrode of the first thin-film transistor of the pixel at (n)th row and (2k+1)th column connects to a corresponding common line, a drain electrode of the first thin-film transistor of the pixel at (n)th row and (2k+1)th column connects to the pixel at (n)th row and (2k+1)th column; and wherein a gate electrode of the first thin-film transistor of a pixel at (n)th row and (2k)th column connects to the first scan line of pixels in (n)th row, a source electrode of the first thin-film transistor of the pixel at (n)th row and (2k)th column connects to a corresponding common line, a drain electrode of the first thin-film transistor of the pixel at (n)th row and (2k)th column connects to the pixel at (n)th row and (2k)th column, where $0<n<N$, $N\geq 2$, $0\leq k\leq (M-1)/2$, $M\geq m\geq 2$, wherein a gate electrode of the second thin-film transistor of the pixel at (n)th row and (2k+1)th column connects to the first scan line of the pixels in (n)th row, a source electrode of the second thin-film transistor of the pixel at (n)th row and (2k+1)th column connects to a corresponding data line, a drain electrode of the second thin-film transistor of the pixel at (n)th row and (2k+1)th column connects to the pixel at (n)th row and (2k+1)th column; and a gate electrode of the second thin-film transistor of the pixel at (n)th row and (2k)th column connects to the second scan line of the pixels in (n)th row, a source electrode of the second thin-film transistor of the pixel at (n)th row and (2k)th column connects to a corresponding data line, a drain electrode of the second thin-film transistor of the pixel at (n)th row and (2k)th column connects to the pixel at (n)th row and (2k)th column.

12. The liquid crystal display device according to claim 11, wherein pixels in a first column correspond to a first common line and pixels in an (M)th column correspond to an (m)th common line; for pixels in a second column to an (M−1)th column, every two columns of pixels correspond to one common line.

13. The liquid crystal display device according to claim 11, wherein voltage polarity is inverted for two pixels on a same side of two adjacent data lines in a same row.

14. The liquid crystal display device according to claim 11, wherein the first thin-film transistor is configured to input the common voltage to the pixel before a data signal is input to the pixel.

15. The liquid crystal display device according to claim 11, wherein two adjacent common lines are located at two sides of two adjacent columns of pixels, respectively.

16. The liquid crystal display device according to claim 11, wherein a voltage of the pixel is equal to the common voltage before a data voltage is input to the pixel.

\* \* \* \* \*